United States Patent [19]

Furuta

[11] 4,420,777

[45] Dec. 13, 1983

[54] TAPE RECORDER WITH CUE PROCESSOR

[75] Inventor: Kenji Furuta, Hachioji, Japan

[73] Assignee: Olympus Optical Co., Ltd., Tokyo, Japan

[21] Appl. No.: 302,232

[22] Filed: Sep. 14, 1981

[30] Foreign Application Priority Data

Sep. 22, 1980 [JP] Japan .................... 55-132187

[51] Int. Cl.³ ............................................. G11B 15/12
[52] U.S. Cl. .......................................... 360/61; 360/63
[58] Field of Search .......................... 360/61, 63, 72.2

[56] References Cited

U.S. PATENT DOCUMENTS 3,539,734 11/1970 Tsuchiya ........................ 360/63
4,095,261 6/1978 Rodriquez ..................... 360/63
4,323,934 4/1982 Giraud ............................ 360/63

FOREIGN PATENT DOCUMENTS 52-2013 1/1977 Japan .

Primary Examiner—Vincent P. Canney
Attorney, Agent, or Firm—Frishauf, Holtz, Goodman and Woodward

[57] ABSTRACT

A tape recorder with a cue signal recording function is arranged to record input signals on corresponding recording tracks of at least two channels, at least one of which is also utilized as a track for cue signal recording. When the cue signal is not being recorded, the cue signal recording track is utilized for recording a given input signal other than the cue signal, in cooperation with recording of other input signals on recording tracks other than the cue signal recording track. During recording of the cue signal on the cue signal recording track, the given input signal is recorded on one of the other recording tracks.

6 Claims, 3 Drawing Figures

TAPE RECORDER WITH CUE PROCESSOR

BACKGROUND OF THE INVENTION

The present invention relates to a tape recorder which has provisions for recording and detecting a cue signal used for cueing of recorded contents.

Tape recorders which utilize compact cassette and microcassette tapes have widely been used due to their handiness and compactness. In a tape recorder, it is very convenient to utilize a cue signal for searching for the desired recorded contents. For example, assume that five pieces of music as the musical source are recorded on side A of the tape and five kinds of cue signals are recorded (immediately before each piece of music). When a third cue signal is specified and the tape is made to travel in the fast forward or rewinding mode, the beginning of the third piece of music is automatically detected. In this way, when the desired recorded position on the tape is searched for by utilizing a cue signal, the cue signal may be recorded on a track for cue signals only for reliable detection. If the cue signals and music are recorded on the same track, a certain component of the music may affect the search procedure, so that cue signal detection may be erroneously performed. As the prior art in which a special track for cue signals as described above is used, a method for recording and reproducing control signals is disclosed in Japanese Patent Publication No. 52-20131 (1977). However, in a tape recorder to which a microcassette tape with a narrow tape width is mounted, the track for cue signals is rarely employed from the viewpoint of performance and compatibility. If a track for cue signals is formed on part of the tape, the sound track width on the narrow tape becomes narrower.

Two independent recording tracks are formed on a tape for a stereo tape recorder. Assume that one of the recording tracks may be utilized as the track for cue signals only for a short period of time for cueing. Also, assume that, with the tape recorder described above, comments of a conference are recorded in the stereo recording mode. A specific cue signal (e.g., 60 Hz) is recorded on the L channel (left channel) at the beginning of every comment by Mr. A. In this case, the comments of Mr. A are at the same time normally recorded on the R channel (right channel), thus eliminating recording failure of Mr. A's comments while the cue signal is recorded on the left channel. Further, after the cue signal recording is completed, the stereo recording mode is immediately restored.

SUMMARY OF THE INVENTION

The present invention is developed from the above-mentioned idea. The object of the present invention is to provide a tape recorder in which compatibility with a conventional tape recorder is not lost, the utilization rate of the tape recording area is not reduced, and accurate recording and detection of the cue signal is performed.

In order to achieve the above object, a tape recorder according to the present invention uses one of plural channels, for example, two channels, as the exclusive track for cue signals only during cue signal recording.

DETAILED DESCRIPTION OF THE PREFERRED EMBODIMENT

Before proceeding with the description of the embodiment of the invention, it will expressly be understood that like reference symbols are used to designate like portions throughout the drawings for simplicity of illustration, and that the components designated by like reference symbols may easily be replaced with each other or one another with minor change thereof by a skilled person in the art. An embodiment of a tape recorder with a cue signal processor according to the invention will be described.

Figure 1:
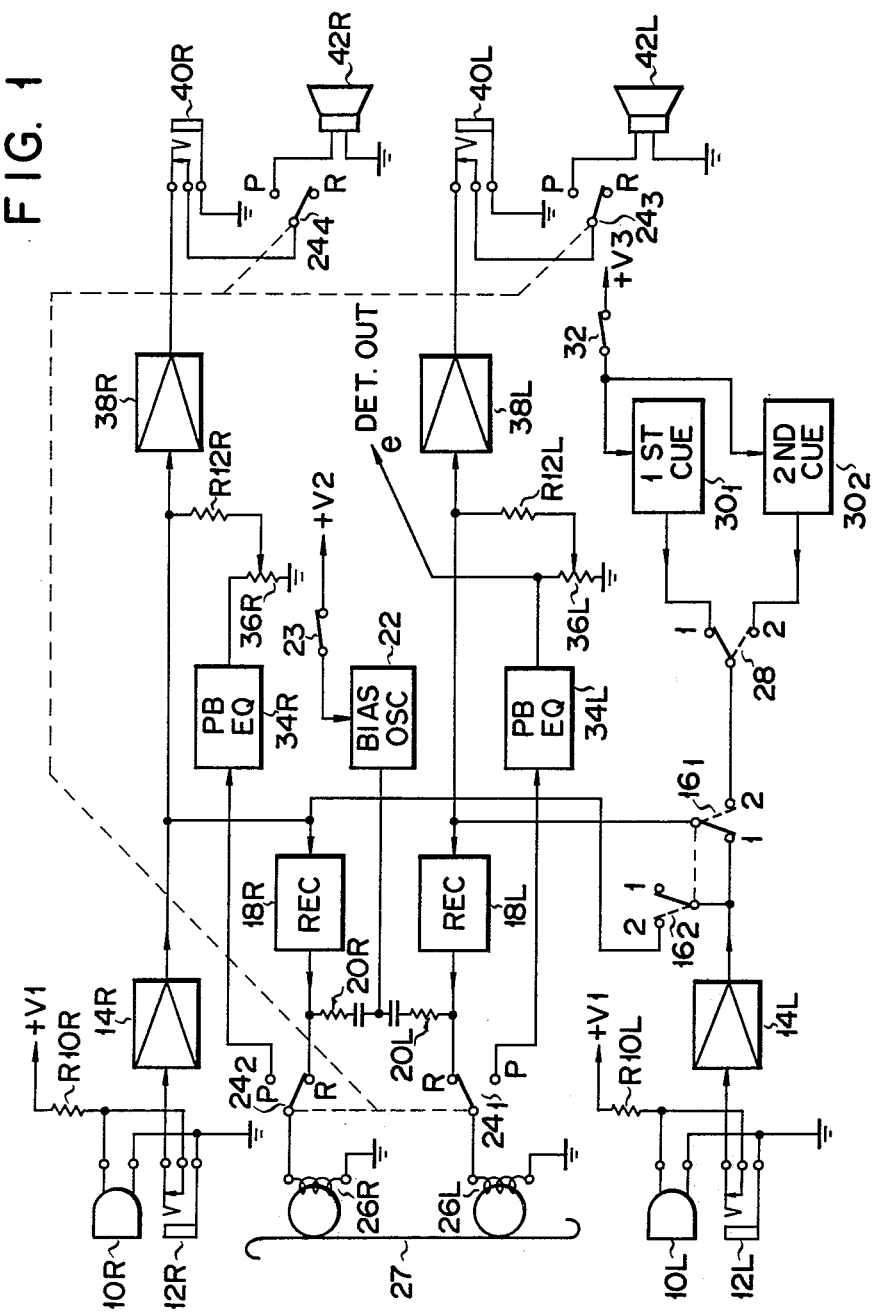
FIG. 1 is a block diagram of one embodiment of a tape recorder according to the present invention.

Referring to FIG. 1, common parts are present between an L (left) channel and an R (right) channel. The detailed description thereof will be made mainly for the L channel. For simplifying the description, the same reference numerals are used for the R channel.

FIG. 1 shows an electric circuitry of a 2-channel stereo tape recorder. The illustration of the mechanical system of the tape recorder is omitted. The power is supplied to an electret capacitor microphone 10L from a power source V1 through a load resistor R10L. An output signal of the microphone 10L is applied to a microphone amplifier 14L through a changeover switch section of a line input jack 12L. The amplifier 14L may include an ALC (automatic level control) circuit or a level controller. An output signal of the amplifier 14L is applied to a recording amplifier 18L through a first contact of a switch $16_1$. A high frequency bias current which is supplied from a bias oscillator 22 is superposed on the recording output signal of the amplifier 18L through an impedance circuit 20L. Power is supplied from a power source +V2 to the oscillator 22 through a switch 23 which is turned on when recording is performed. The oscillator 22 thus oscillates. The recording output signal on which the bias current is superposed is supplied to a recording/playback head 26L through an R terminal of a recording/playback changeover switch $24_1$. Sound pressure data fed to the microphone 10L or an electric signal applied to the input jack 12L is recorded on a recording tape 27 through the head 26L. The recording operation of the R channel is the same as that of the L channel.

For recording a cue signal, the switch $16_1$ is changed over to a second contact. The second contact of the switch $16_1$ is connected to a first cue signal source $30_1$ or a second cue signal source $30_2$ through a switch 28. When three kinds of cue signals or more are used, three cue signal sources 30 or more are prepared, and a switch with three contacts or more is used as the switch 28. The signal source $30_1$ may be an astable multivibrator of 60 Hz oscillation frequency, and the signal source $30_2$ may be an astable multivibrator of 600 Hz oscillation frequency. The signal sources $30_1$ and $30_2$ may be formed by signal generators which generate sinusoidal or other waveforms. When a switch 32 is turned on, power is supplied from a power source +V3 to the signal sources $30_1$ and $30_2$. The signal sources $30_1$ and $30_2$ thus oscillate. When the switch 32 is turned on while the switches $16_1$ and 28 select the second and first contacts, respectively, the cue signal of 60 Hz output from the signal source $30_1$ is recorded at a predetermined position on the L channel track of tape 27. When the switch 32 is turned on while the switch 28 selects the second contact, a cue signal of 600 Hz is recorded on the tape 27.

The output signal of the amplifier 14L is applied to the recording amplifier 18R through a second contact of a switch $16_2$ which is ganged with the switch $16_1$. Therefore, while cue signal recording is being performed, data which is equivalent to the data of the right and left channels are recorded on the R channel. When the switches $16_1$ and $16_2$ are at the first contact, or when cue signal recording is not performed, normal 2-channel recording using the right and left channels is performed.

In the playback mode, the switch $14_1$ is changed over to a P terminal. The playback output of the head 26L is then applied to a playback equalizer 34L. The playback output of the equalizer 34L is applied to a power amplifier 38L through a volume controller 36L and a resistor R12L. The output signal of the amplifier 38L is fed to a speaker 42L through a changeover switch section of an output jack 40L and a P terminal of a recording/playback changeover switch $24_3$. A cue signal detection output e is obtained as an output signal of the equalizer 34L. When a cue signal recording portion passes through a gap portion of the head 26L, the detection output 3 is obtained. The detection output e may be obtained through the output jack 40L.

Figure 2:
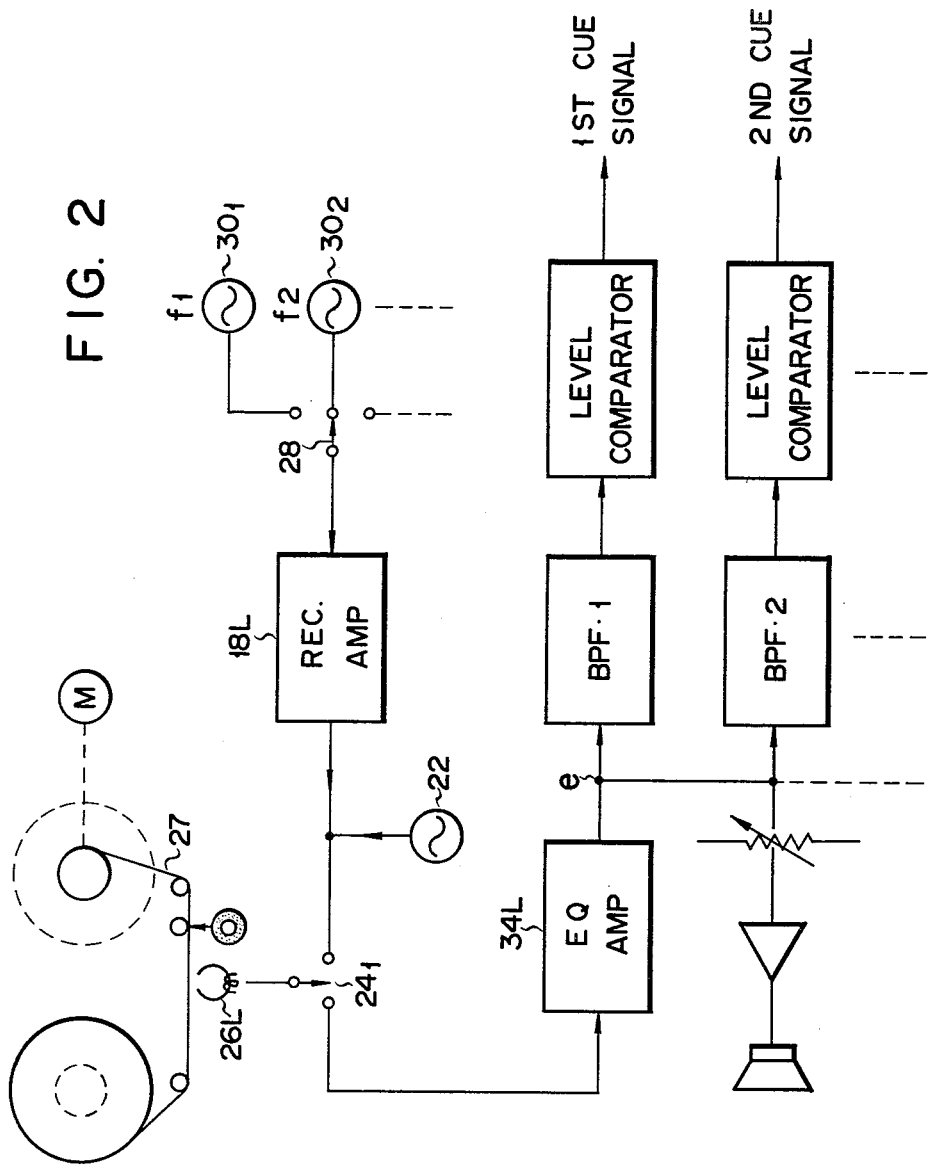
FIG. 2 is a block diagram illustrating a cue signal detection circuit built into the tape recorder shown in FIG. 1.

The detection output e has an inherent frequency distribution corresponding to the signal source $30_1$ or $30_2$. Therefore, the recorded position of the cue signal of the first cue signal source $30_1$ may be distinguished from that of the second cue signal source $30_2$. For this distinction, a frequency separation system is usually utilized. See, for example, Japanese Patent application No. 54-107,516 (1979) "Cue Signal Generating System", which was filed by the same applicant as in the present invention. The above application corresponds to U.S. Ser. No. 171,970 (inventor: K. FURUTA) which was filed on July 24, 1980. FIG. 2 shows a cue signal detection circuit which corresponds to FIG. 1 of the above U.S. Ser. No. Refer to the above U.S. patent application for further details on operations on the detection output e.

The following U.S. patent applications are concerned with recording/detecting of the cue signal:

(1) U.S. Ser. No. 138,195 filed on Apr. 7, 1980 (inventor: K. FUJIBAYASHI), (2) U.S. Ser. No. 168,197 filed on July 10, 1980 (inventor: Y. YANAGIDA), (3) U.S. Ser. No. 187,764 filed on Sept. 16, 1980 (inventor: K. FURUTA), and (4) U.S. Ser. No. 171,533 filed on July 23, 1980 (inventor: K. FURUTA).

The detection output e may be utilized for automatic repeating. Assume that the first cue signal (60 Hz) is recorded at the beginning of a piece of music and that the signal (600 Hz) is recorded at the end of this piece of music. When the first cue signal is detected from the detection output e, playback of the piece of music starts. When playback of this piece of music is completed and the second cue signal is detected, the tape is automatically rewound until the first cue signal is detected. When the first cue signal is detected, the same piece of music is played again. If at the beginning of every comment by Mr. A the first cue signal is recorded while at the beginning of every comment by Mr. B the second cue signal is recorded, the search may be made only for Mr. A's comments or Mr. B's comments for convenience. In this case, even while the first and second cue signals are recorded on one of the channels, comments by Mr. A and Mr. B are recorded on the R channel, thus eliminating erratic recording or partial omissions of recording of the comments. The cue signals may be recorded on the R channel instead of the L channel.

Figure 3:
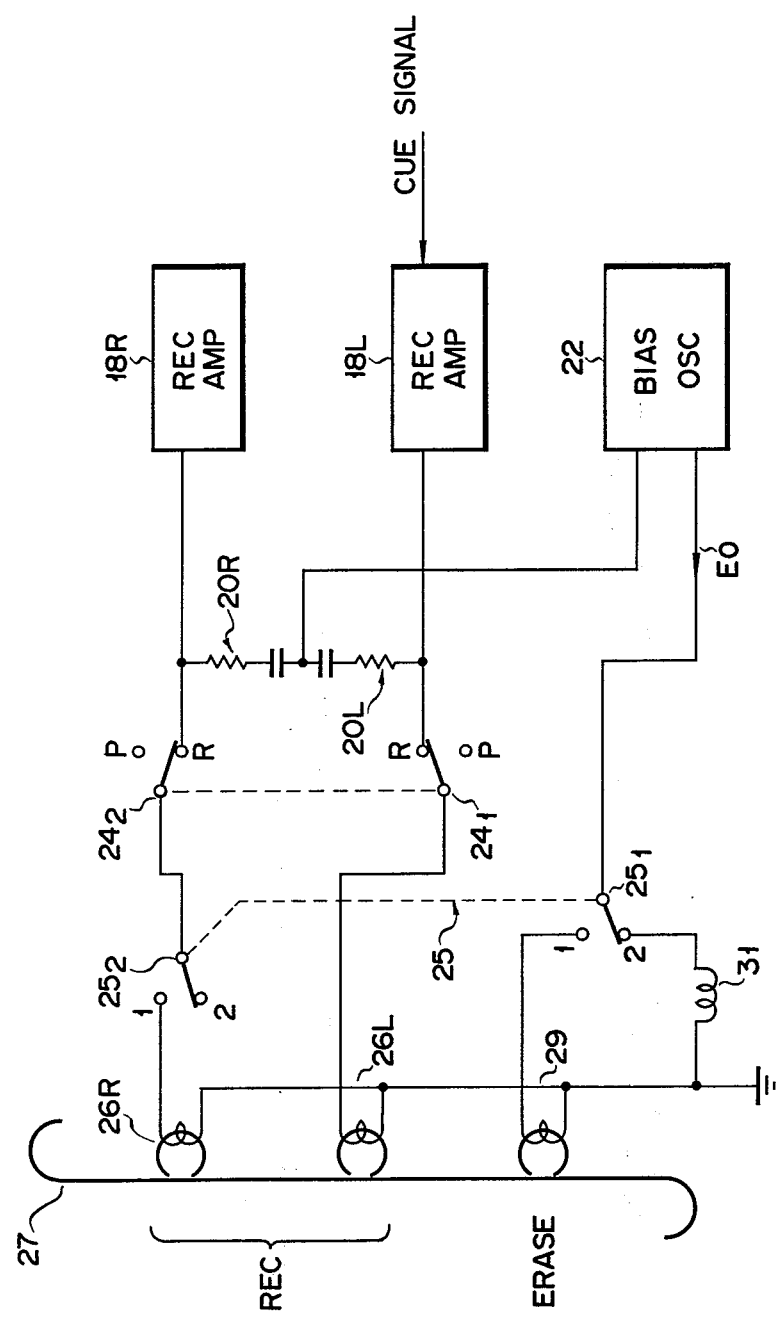
FIG. 3 shows a modification of the cue signal detection circuit of FIG. 1.

FIG. 3 shows an arrangement in which a cue signal is recorded on a recorded tape. A cue signal which is amplified at the L channel recording amplifier 18L is supplied to the L channel recording/playback head 26L together with a bias current supplied from the bias oscillator 22, through the R terminal of the recording/playback changeover switch $24_1$. An output signal of an R channel recording amplifier 18R and a bias current supplied from the oscillator 22 are supplied to the R terminal of a recording/playback changeover switch $24_2$. The contact piece of the switch $24_2$ is connected to a contact piece of a cue signal recording mode switch $25_2$. The first terminal of the mode switch $25_2$ is connected to an R channel recording/playback head 26R. The second terminal of the mode switch $25_2$ is a free end or is grounded. An erase current output Eo of the bias oscillator 22 is supplied to a contact piece of a cue signal recording mode switch $25_1$. An erase head 29 is connected to the first terminal of the mode switch $25_1$. A dummy load 31 which is of substantially the same impedance as the head 29 is connected to the second terminal of the mode switch $25_1$.

The mode switch $25_1$ is ganged with the mode switch $25_2$. For normal recording, the mode switch 25 selects the first terminal side. For recording the cue signal on the recorded tape 27, the mode switch 25 is changed over to the second terminal side. The erase head 29 and the R channel recording head 26R are disabled. In this condition, when the cue signal is recorded on the L channel, the magnetization level of the recorded contents is lowered due to a bias magnetic field generated by the head 26L. However, only the L channel has reduction of magnetization level, while the recorded contents of the R channel remain unaffected. Therefore, in the place where the cue signals are additionally recorded, the originally recorded contents do not become unclear.

The erase head 29 may be formed by a permanent magnet. In this case, the switch $25_1$ and the dummy load 31 are not required. Instead, a mechanism which separates the permanent magnet head 29 from the tape 27 must be used.

The embodiment disclosed in the specification and shown in the drawings does not limit the present invention. Further, various changes and modifications may be made within the spirit and scope of the present invention and the appended claims. For example, the application range of the present invention is not limited to cassette tape recorders, but may be extended to all tape recorders using tapes in which a recording track of 2 channels or more is adopted and a track for cue signals is difficult to incorporate because of the need for compatibility of tapes of other tape recorders. The separation of a plurality of cue signals is achieved not only based on a frequency separation system, but also based on a level separation system. Further, a system as disclosed in Japanese Patent Publication No. 53-28,082 (1978) may be utilized for this purpose.

What is claimed is:

1. A tape recorder with a cue signal processor, comprising:

first means for providing a first recording signal;

second means for providing a second recording signal;

third means for providing a predetermined cue signal;

fourth means connected to said first means and said third means, for selecting said first recording signal or said cue signal to provide a selected signal;

fifth means connected to said second means and said fourth means and including means for recording signals on a first recording channel and a second recording channel, for recording said selected signal on said first recording channel and for recording said second recording signal on said second recording channel; and sixth means connected to said fifth means, for detecting said cue signal from said first recording channel.

2. A tape recorder of claim 1, further comprising:

seventh means connected to said first means, said fourth means and said fifth means, for mixing said second recording signal with said first recording signal when said fourth means selects said cue signal, wherein said first and said second recording signals are mixed and recorded by said fifth means on said recording channel.

3. A tape recorder of claim 1 or 2, wherein said third means includes a first signal source for generating a first cue signal;

a second signal source for generating a second cue signal; and a cue signal selector connected to said first and said second signal sources, for selecting said first cue signal or said second cue signal as said predetermined cue signal.

4. A tape recorder of claim 3, wherein said sixth means includes means for separately detecting said first cue signal and said second cue signal as selected by said cue signal selector.

5. A tape recorder of claim 1 or 2, wherein said fifth means includes a first recording head for recording signals on said first recording channel;

a second recording head for recording signals on said second recording channel;

an erase head for erasing said first and said second recording channels;

a bias signal source connected to said first recording head and said second recording head, for providing predetermined bias currents to said first and said second recording heads;

erase prohibiting means connected to said erase head, for disabling operation of said erase head when said predetermined cue signal is recorded on said first recording channel; and bias prohibiting means connected to said second recording head and said bias signal source, for disabling said bias currents from flowing through said second recording head when said predetermined cue signal is recorded on said first recording channel.

6. A tape recorder with a cue signal processor, comprising:

input signal recording means for recording a predetermined input signal on a corresponding one of at least two recording channels;

cue signal recording means connected to said input signal recording means, for recording a predetermined cue signal which is separate from said input signal on at least one of said recording channels, wherein a recording channel other than said corresponding one is utilized for recording of said input signal during a period in which said cue signal is recorded on said at least one of said recording channels; and cue signal detecting means connected to said input signal recording means, for detecting said cue signal on said at least one of said recording channels;

wherein said input signal recording means is disabled from recording said predetermined input signal on the corresponding recording channel during the period in which said cue signal recording means is operated to record said cue signal on said at least one of said recording channels.

* * * * *